May 17, 1949.

F. O. IBISCH 2,470,101

ACTUATING MEANS FOR SIMULATED RADIO
COMPASS ON AVIATION TRAINERS
Filed May 5, 1945

INVENTOR.
FRANZ O. IBISCH
BY
Ralph L. Chappell
ATTORNEY.

Patented May 17, 1949

2,470,101

UNITED STATES PATENT OFFICE 2,470,101

ACTUATING MEANS FOR SIMULATED RADIO COMPASS ON AVIATION TRAINERS

Franz O. Ibisch, United States Navy, Columbus, Wis.

Application May 5, 1945, Serial No. 592,152

5 Claims. (Cl. 35—10)

(Granted under the act of March 3, 1883, as amended April 30, 1928; 370 O. G. 757)

This invention relates to new and useful improvements in teletorque devices used in conjunction with "Link trainers" and more particularly to an automatically operated teletorque device which provides a more realistic actuation of the radio compass of a "Link trainer."

The "Link trainer", as disclosed for example in Link Patent 2,179,663, is an apparatus for instructing in the art of navigating an aircraft solely by instruments. The Link apparatus includes an indicator mounted in a movable carriage, commonly referred to as a "crab," which indicator represents an aircraft and travels or moves over an aerial chart or map in accordance with the manipulations of suitable controls by the student being instructed. A teletorque device, including an electrical generator, is provided to simulate the operation of a radio direction system which includes a dashboard compass indicating the bearing of a radio transmitter with respect to the aircraft in which the compass is mounted. The generator of the teletorque device is manually operated and is electrically connected any synchronized with the motor of a device simulating a radio compass in such a manner as to actuate the same and give the bearing, relative to the indicator or crab, of the point simulating the location of the transmitter to which the radio compass is supposed to be tuned or which is being employed as a guide by the student. Heretofore, it has been necessary for the instructor or an assistant to constantly adjust the teletorque generator in accordance with the movement of the indicator so as to constantly vary the reading of the radio compass and thereby inform the student of the relative bearing of said transmitter.

The principal object of the invention is, therefore, to provide an improved teletorque device which is automatic in operation so as to accurately control the actuation of the radio compass of a "Link trainer," whereby said compass is constantly adjusted and gives the correct relative bearings and whereby manual adjustment of the teletorque device is eliminated.

Other objects of the invention are to provide an improved teletorque device which is mounted in such a manner that the same is automatically operated in accordance with the movement of the plane-position indicator relative to the radio transmitter to which the radio compass of the "Link trainer" is tuned, or which is being employed as a guide by the student and thereby actuate the same to give the correct relative bearing; to provide an improved teletorque device which is adapted to be mounted on the indicator supporting carriage and which has means for selectively and releasably connecting the same by mechanical means to the particular radio transmitter employed as a guide so as to more realistically simulate the broadcasting of unidirectional signals by said transmitter; to provide an improved mounting and connection for a teletorque device having meshing gear means with one gear means being connected to the generator of the teletorque device for adjusting its output and the other gear means being freely rotatable and selectively connected by a rigid arm and flexible means to one of the symbolic radio transmitters so as to be rotated relative to the transmitter upon the position of the indicator varying with respect to said transmitter, whereby the first gear means is rotated and the reading of the radio compass is automatically altered or adjusted to give a correct relative bearing; and to provide improved elements and arrangements thereof in a teletorque device, of the character described and for the purposes set forth.

In accomplishing these and other objects of the invention, I have provided improved details of structure, the preferred form of which is illustrated in the accompanying drawing, wherein.

Figure 1:
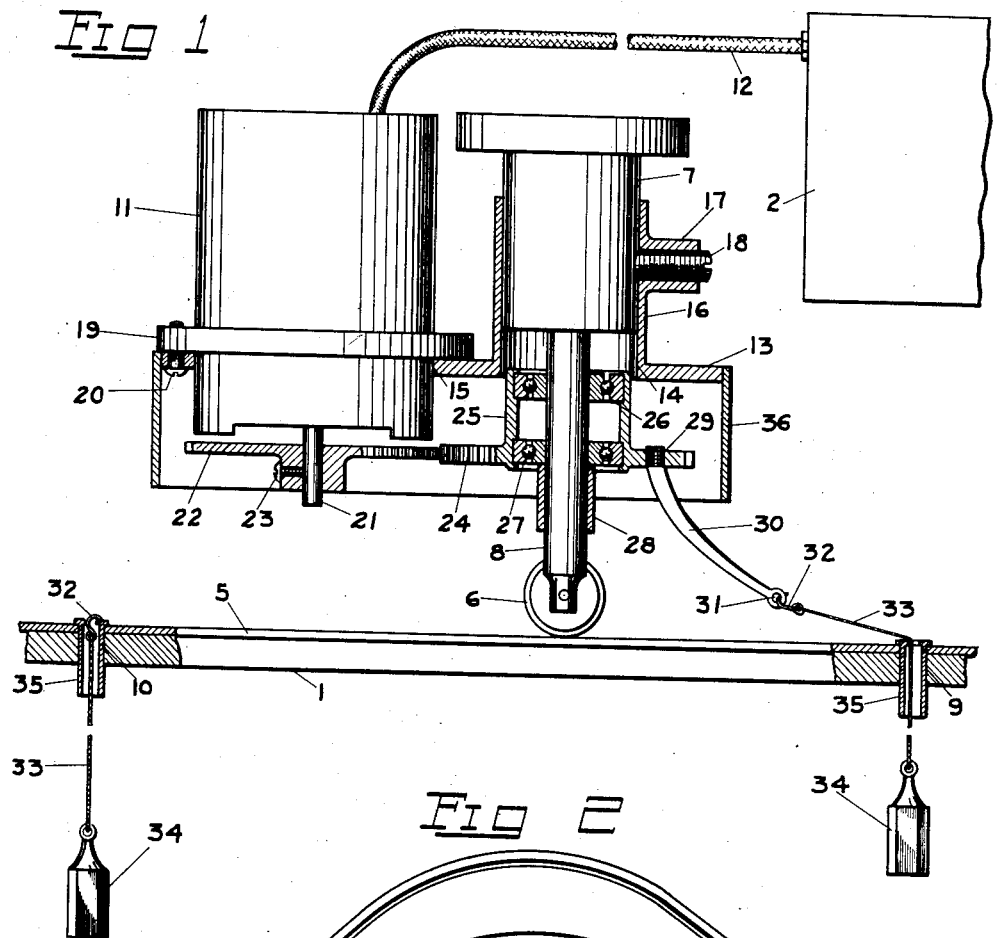
Fig. 1 is a view, partly in elevation and partly in section, of a portion of a "Link trainer" embodying the features of the present invention, and showing the teletorque device with its rotatable gear means having detachable connection with one of the symbolic radio transmitters.

Referring more in detail to the drawings:

In Fig. 1, the numeral 1 designates a chart table or support for an apparatus employed in instructing in the navigation of an aircraft by instruments, which apparatus is commonly known as a 'Link trainer." Although not illustrated, the apparatus customarily includes a cockpit compartment which is universally rotatable in response to the operation of suitable controls by the stduent being instructed and which has a conventional instrument panel disposed therein so as to be observable by said student.

Figure 2:
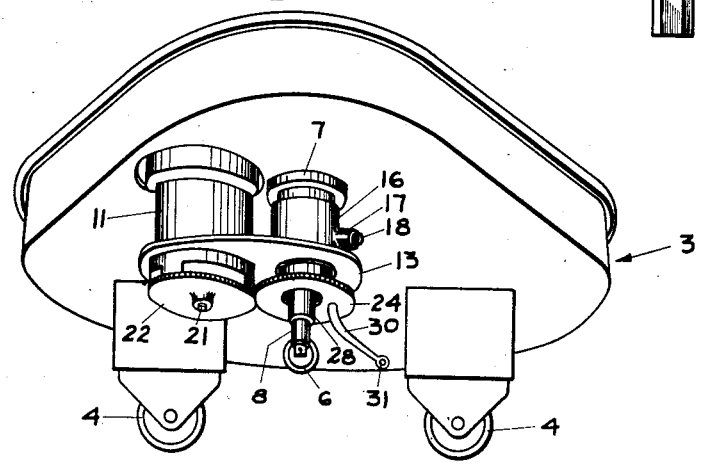
Fig. 2 is an underside, perspective view showing the relationship of the teletorque device to the crab or indicator support of the "Link trainer."

Among other well-known instruments, the panel has a radio compass 2 mounted therein and this compass includes a teletorque motor (not shown) for actuating said compass and altering the reading thereof. A movable carriage 3 (Fig. 2), which is of a generally triangular shape and which is commonly referred to as a "crab," is supported upon the flat top or upper surface of the table 1 by means of a pair of spaced caster rollers or wheels 4 and is adapted to be moved relative to said table top in response to the manipulation of suitable controls (not shown) in the compartment by the student. The table has an aerial map or chart 5 mounted upon its flat top and the carriage 3 is provided with an indicating or bearing wheel or disk 6 of small diameter to assist the wheels 4 in supporting said carriage upon said table and the chart. As is well-known, the indicating disk 6 is representative of the aircraft being maneuvered or navigated by the student and indicates the position of said aircraft relative to the chart 5.

A suitable cylindrical housing 7 depends from the underside of the carriage 3 and has a shaft 8 journaled therein, and projecting axially, downwardly therefrom. The indicating disk is preferably rotatably supported by the lower projecting end of the shaft 8 so as to be movable upon the chart 5 in any direction.

A plurality of short-wave radio transmitters or stations for broadcasing unidirectional signals are suitably designated upon the chart and two of the transmitters are indicated by openings 9 and 10 which extend through the chart and table. As is well-known, broadcasted signals are customarily employed as guides in navigating the aircraft or moving the indicating disk 6 relative to the chart.

For actuating the motor of the radio compass 2 so as to alter the reading of said compass, a teletorque device is provided and includes an electrical generator 11 synchronous with and electrically connected to said motor by a suitable electrical conductor 12, whereby adjustment of the output of the generator results in the alteration of the reading of the radio compass. The latter reading indicates the bearing of the indicating disk relative to the particular transmitter employed as a guide and permits the student to determine the true bearing of said indicating disk as well as the position of the same by the use of other conventional instruments (not shown). Ordinarily, the chart is shielded against observation by the student.

Heretofore, the teletorque device has been mounted apart from the carriage 3 and it has been necessary for the instructor or an assistant to manually adjust the generator 11 of said teletorque device so as to vary its output in accordance with the movement or bearing of the indicating disk relative to the particular transmitter employed as a guide by the student. In order to accomplish this adjustment of the generator 11 automatically and eliminate the necessity for manual adjustment of the same, I have provided a novel mounting and operating means for said generator which is preferably as set forth hereinafter.

The generator 11 is adapted to be supported by the carriage 3 (Fig. 2) so as to be movable therewith and permit automatic adjustment of said generator in accordance with such movement. A substantially oval, flat plate or bracket 13, of metal or other suitable material, is provided for supporting the generator 11 and has a pair of large, spaced openings 14 and 15 formed therein. The opening 14 is surrounded by an upstanding, cylindrical collar 16 which is preferably made integral with the bracket 13 and which has a bore of such diameter as to snugly engage around the housing 7. An internally screw-threaded, radial boss 17 is formed on the collar 16 and has a set screw 18 extending therethrough and engaging the cylindrical exterior of the housing, whereby the bracket 13 is supported in a plane parallel to the underside of the carriage 3. Since the housing 7 engages within the collar 16, the shaft 8 projects axially, downwardly through the bore of said collar and the opening 14 of the bracket.

The generator 11 extends through the opening 15 and is provided with an annular, radial flange 19 adjacent its lower end or base which overlies said opening for supporting said generator. Suitable screws 20 project upwardly through the flange 19 and secure the generator in position. An axial shaft 21 depends from the generator and has a spur wheel or gear 22, of brass or other suitable material, fastened to its lower end by a suitable set screw 23, whereby rotation of the gear turns the shaft to vary the output of said generator and thereby actuate the motor of the radio compass 2 so as to alter the bearing reading of said compass.

For rotating the gear 22, an annular spur wheel or gear 24 is rotably mounted upon the shaft 8 above the disk 6 and has its teeth in constant mesh with the teeth of said gear 22. The gear 24 is formed of brass, or other suitable material and has an annular, upstanding flange or collar 25 surrounding and in axial alinement with its bore or opening. Although the collar 25 may be soldered or otherwise secured to the inner peripheral surface of the gear 24, said collar is shown as being made integral with said gear for the purpose of illustration. The external diameter of the gear collar is slightly less than the diameter of the bracket opening 14 so as to have its upper end engage loosely within said opening. A pair of spaced ball bearing assemblies 26 and 27 are arranged within the collar in surrounding relation to the shaft 8 for permitting relative, independent rotation of the gear 24 and said shaft. For supporting the gear 24 upon the shaft 8, a cylindrical spacer sleeve 28 has a snug sliding fit upon said shaft below said gear so as to engage the inner race of the lower ball bearing assembly 27 and is preferably fastened in a fixed position upon the shaft.

In order to rotate the gears 22 and 24 in response to the movement of the indicating disk 6 relative to one of the transmitters 9 and 10, a screw-threaded opening 29 is formed in said gear 24 adjacent its external periphery and has a substantially arcuate, depending arm or element 30 threaded thereinto so as to project radially from the gear. The outer lower end of the arm 30 is formed with an eye 31 for detachably receiving a hook 32 which is fastened to one end of a flexible line 33, such as a thread, fine wire or other similar means. A separate line extends through each of the transmitter openings 9 and 10 and has a suitable weight 34 connected to its lower end so as to depend below said opening. For receiving and facilitating threading of the line 33, a flanged collar or collet 35 is disposed within each opening and has its flange overlying the portion of the chart 5 surrounding the opening.

By attaching the hook 32 of one of the lines 33 to the eye 31 of the arm 30, the weight turns or directs said arm toward the respective opening of said line so as to rotate the gear 24 relative to said opening upon angular movement of the carriage 3 and its indicating disk 6 due to manipulation of controls by the student being instructed. Thus, the radio compass 2 is automatically actuated so as to give the correct relative bearing of the indicating disk because of the meshing of the gear 22 with the gear 24 and the connection of said first gear to the shaft 21 of the generator 11 which is synchronized with and electrically connected by the conductor 12 to the motor of said compass.

Since the gear 24 is axially aligned with the point of contact of the indicating disk 6 with the chart 5 and since the line 33 constantly directs the arm 30 toward the transmitter opening being employed as a guide, there is no necessity for manually adjusting the generator 11. When not in use, the lines 33 are retracted or drawn downwardly by their weights 34 so as to be suspended from their collars 35 with their hooks 32 engaging the flanges of said collars. Therefore, the lines are immediately available for use without interfering with the travel of the carriage.

An oval shield or band 36, complementary to the bracket 13 and formed of similar material surrounds said bracket and preferably has a snap-on or frictional fit thereupon so as to depend therefrom and encompass the gears 22 and 24 for protecting the same against damage (Fig. 1). This shield or band has been omitted from Fig. 2 for the sake of clarity.

*Operation*

The operation of a teletorque device constructed as described is as follows:

The student being instructed elects or is requested to employ one of the transmitters and the instructor or an assistant connects the hook 32 of the line 33 of said transmitter, such as the transmitter opening 9, to the eye 31 of the arm 30. Upon movement of the carriage 3 relative to the chart 5 by the manipulation of controls by the student, the weight 34 maintains the line 33 taut so as to constantly direct the arm 30 toward the transmitter opening 9, as shown in Fig. 1, irrespective of the direction of such movement or the angularity of the same with respect to said opening. Due to the provision of the meshing gears 22 and 24 and the axial alignment of said gear 24 with the point of contact of the indicating disk 6 with the chart 5, the generator 11 is automatically adjusted so as to vary its output in accordance with the angular relation of the direction of travel of said disk to the opening 9.

Thus, the synchronous motor of the radio compass 2 is accordingly actuated so as to alter the reading of said compass, whereby the same gives the correct relative bearing of the indicating disk and continues to do so even when the direction of travel of said wheel is changed.

Whenever another transmitter, such as the transmitter opening 10, is employed as a guide, the hook 32 of the line 33 which extends through the opening 9 is disconnected from the eye 31 and the hook of the line extending through said opening 10 is connected to said eye. In this event, the teletorque device is actuated relative to the opening 10, due to the line of said opening being maintained taut by its weight 34. Manifestly, the line extending through the opening 9 is retracted by its weight so as to be suspended from the collar 35 of said opening by its hook and be readily available for subsequent use.

I have described one embodiment of my invention. However, it will be apparent that the device is susceptible to numerous modifications without departing from the spirit of the invention. Therefore, I do not wish to be limited by the disclosure set forth hereinbefore, but only by the scope of the appended claims.

The invention described herein may be manufactured and used by or for the Government of the United States of America for governmental purposes without the payment of any royalties thereon or therefor.

I claim:

1. An apparatus for instructing instrument navigation of aircraft including an aerial chart having a plurality of openings representing short-wave radio transmitters, an indicator representing an aircraft movable relative to said chart, means operable by a student for moving the indicator, a device simulating a radio compass, a teletorque device having an electrical generator movable with the indicator, the radio compass device having a motor electrically connected to and synchronized with the teletorque generator whereby the reading of said compass device is adjusted by actuation of said generator, a freely-rotatable gear carried by and axially alined with the indicator, a weighted line having connection with the gear and adapted to extend through any one of the chart openings for orienting said gear relative to the opening, and a second gear in constant mesh with the freely-rotatable gear and driven by the rotation thereof, the second gear having connection with the teletorque generator for varying the output of the same and actuating the radio compass device motor to determine the reading of said compass device.

2. An apparatus for instructing instrument navigation of aircraft including an aerial chart having a plurality of openings representing short-wave radio transmitters, an indicator representing an aircraft movable relative to said chart, means operable by a student for moving the indicator, a device simulating a radio compass, a teletorque device having an electrical generator movable with the indicator, the radio compass device having a motor electrically connected to and synchronized with the teletorque generator whereby the reading of said compass device is adjusted by actuation of said generator, a freely-rotatable gear carried by and axially alined with the indicator, a rigid arm projecting radially from the gear, a weighted line having connection with the arm and adapted to extend through any one of the chart openings for orienting said gear relative to the opening, and a second gear in constant mesh with the freely-rotatable gear and driven by the rotation thereof, the second gear having connection with the teletorque generator for varying the output of the same and actuating the radio compass device motor to determine the reading of said compass device.

3. An apparatus for instructing instrument navigation of aircraft including an aerial chart having a plurality of openings representing short-wave radio transmitters, an indicator representing an aircraft movable relative to said chart, means operable by a student for moving the indicator, a device simulating a radio compass, a teletorque device having an electrical generator movable with the indicator, the radio compass device having a motor electrically connected to and synchronized with the teletorque generator so that the reading of said compass device may be adjusted by actuation of said generator, a gear train movable with the indicator and having connection with the teletorque generator for varying the output of the generator and actuating the radio compass device motor to adjust the reading of said compass device, and means having connection with the gear train and any one of the chart openings for actuating the gear train upon movement of the indicator relative to said chart, said gear train including a pair of meshing gear means, one gear means being axially alined with the indicator and being rotated by the connecting means for driving the other gear means, the other gear means being connected to the teletorque generator to adjust its output upon rotation of the first gear means.

4. In a device which travels over a surface and thereby simulates travel of a real craft, said device having a shaft extending downwardly toward said surface and a wheel rotatably mounted on said shaft which rolls on said surface, the combination of a first gear rotatably mounted on said device coaxially with said shaft and above said wheel, position transmitting means mounted on said device and having a rotatable shaft, a second gear mounted on the shaft of said position transmitting means meshing with said first gear, means for maintaining predetermined angular orientation of said first gear with respect to a given point on said surface, and means responsive to the angular position of the rotatable shaft of said position transmitting means with respect to said device for simulating a radio compass bearing.

5. In a device which travels over a surface and thereby simulates travel of a real craft, said device having a shaft extending downwardly toward said surface and a wheel rotatably mounted on said shaft which rolls on said surface, the combination of a first gear rotatably mounted on said device coaxially with said shaft and above said wheel, position transmitting means mounted on said device and having a rotatable shaft, a second gear mounted on the shaft of said position transmitting means meshing with said first gear, an arm mounted on said first gear and extending radially downward therefrom toward said surface, a tension element connected to said arm and extending to a predetermined point on said surface, whereby to maintain said arm always directed toward said point during travel of said device over said surface, and means responsive to the angular position of the rotatable shaft of said position transmitting means with respect to said device for simulating a radio compass bearing.

FRANZ O. IBISCH.

REFERENCES CITED

The following references are of record in the file of this patent:

UNITED STATES PATENTS

| Number | Name | Date |
| --- | --- | --- |
| 2,164,412 | Koster | July 4, 1939 |
| 2,179,663 | Link | Nov. 14, 1939 |
| 2,321,799 | Cone | June 15, 1943 |
| 2,346,693 | Lyman | Apr. 18, 1944 |
| 2,366,603 | Dehmel | Jan. 2, 1945 |
| 2,396,141 | Adorjan | Mar. 5, 1946 |